United States Patent
Masunishi et al.

(10) Patent No.: US 7,682,030 B2
(45) Date of Patent: Mar. 23, 2010

(54) DEFORMABLE MIRROR APPARATUS

(75) Inventors: Kei Masunishi, Kawasaki (JP); Akihiro Koga, Tokyo (JP); Ryo Furukawa, Kawasaki (JP); Tetsuya Kugimiya, Kawasaki (JP); Akio Kobayashi, Sano (JP); Hiroyuki Kawashima, Warabi (JP)

(73) Assignees: Kabushiki Kaisha Toshiba, Tokyo (JP); Kabushiki Kaisha Topcon, Tokyo (JP)

( * ) Notice: Subject to any disclaimer, the term of this patent is extended or adjusted under 35 U.S.C. 154(b) by 83 days.

(21) Appl. No.: 12/032,871

(22) Filed: Feb. 18, 2008

(65) Prior Publication Data
US 2008/0239528 A1  Oct. 2, 2008

(30) Foreign Application Priority Data
Mar. 27, 2007  (JP) ............................. 2007-081923

(51) Int. Cl.
G02B 7/188 (2006.01)
G02B 26/00 (2006.01)
G02B 26/08 (2006.01)

(52) U.S. Cl. .................. 359/847; 359/291; 359/198
(58) Field of Classification Search .......... 359/198, 359/212, 214, 290, 291, 295, 847
See application file for complete search history.

(56) References Cited

U.S. PATENT DOCUMENTS 7,192,144 B2 * 3/2007 Ho .............................. 359/846

2008/0180634 A1  7/2008  Koga et al.
2008/0204661 A1  8/2008  Koga et al.

OTHER PUBLICATIONS

Kurczynski, Large Amplitude Wavefront Generation andCorrection with Membrane Mirrors, Optics Express 509 dated Jan. 23, 2006, vol. 14, No. 2.

* cited by examiner

Primary Examiner—William C Choi
(74) Attorney, Agent, or Firm—Turocy & Watson, LLP

(57) ABSTRACT

It is made possible to provide a deformable mirror apparatus which is deformable to a complicated shape (high-order shape). A deformable mirror apparatus includes: a substrate; a plurality of electrodes provided on the substrate; a spacer fixed above the substrate, having a first opening passing through from a first face of the spacer facing to the substrate to a second face of the spacer facing opposite from the first face, surrounding the electrodes, and having a step on the second face; a drive part including a membrane part disposed so as to cover the step of the spacer and so as to be opposed to the electrodes, a casing part having an opening at a bottom face of which the membrane part is exposed and supporting the membrane part, and a reflection film provided on the membrane part; and a voltage generator configured to generate predetermined voltage patterns on the electrodes, respectively.

7 Claims, 16 Drawing Sheets

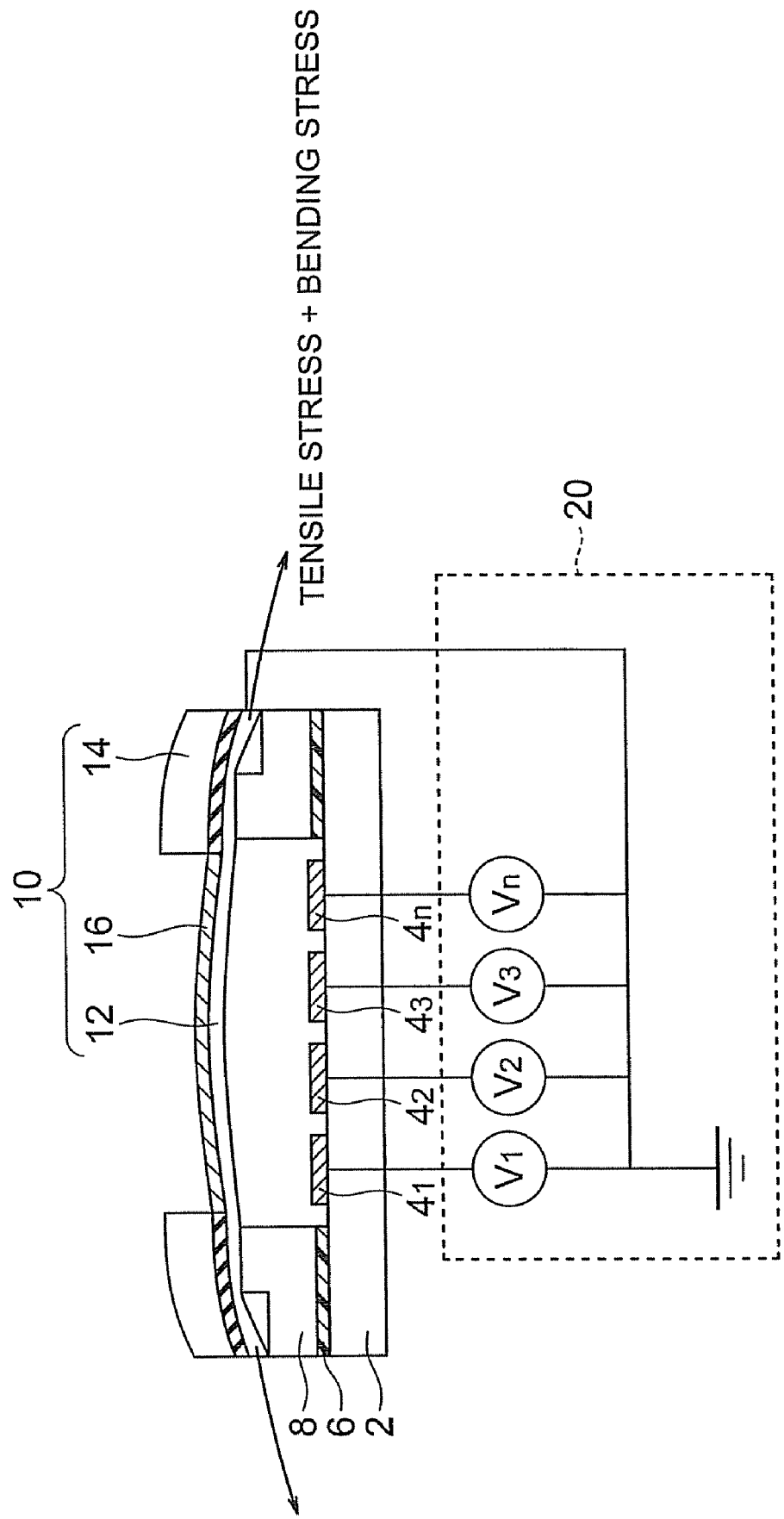

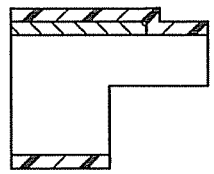 FIG. 12A 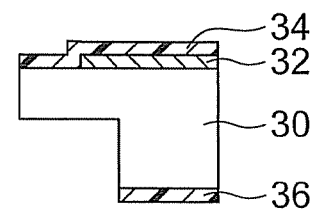
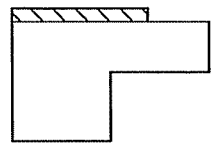 FIG. 12B 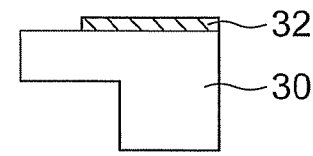
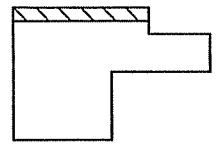 FIG. 12C 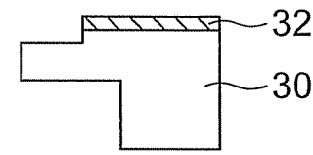
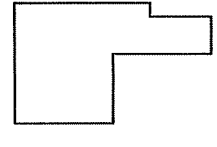 FIG. 12D 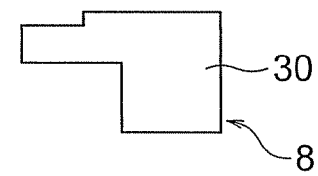

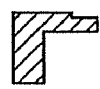 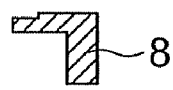 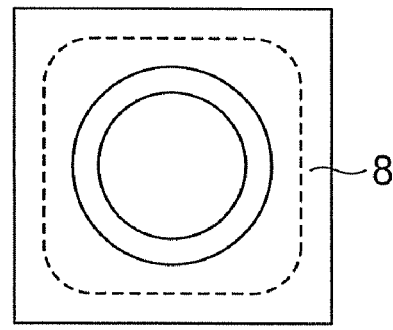
FIG. 13A          FIG. 13B
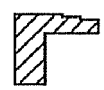 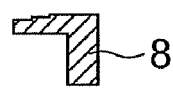 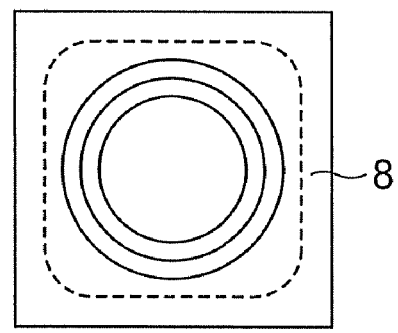
FIG. 14A          FIG. 14B
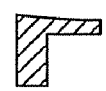 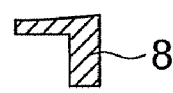 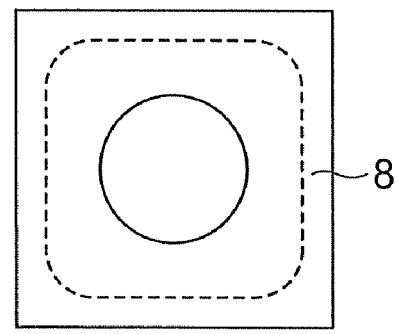
FIG. 15A          FIG. 15B

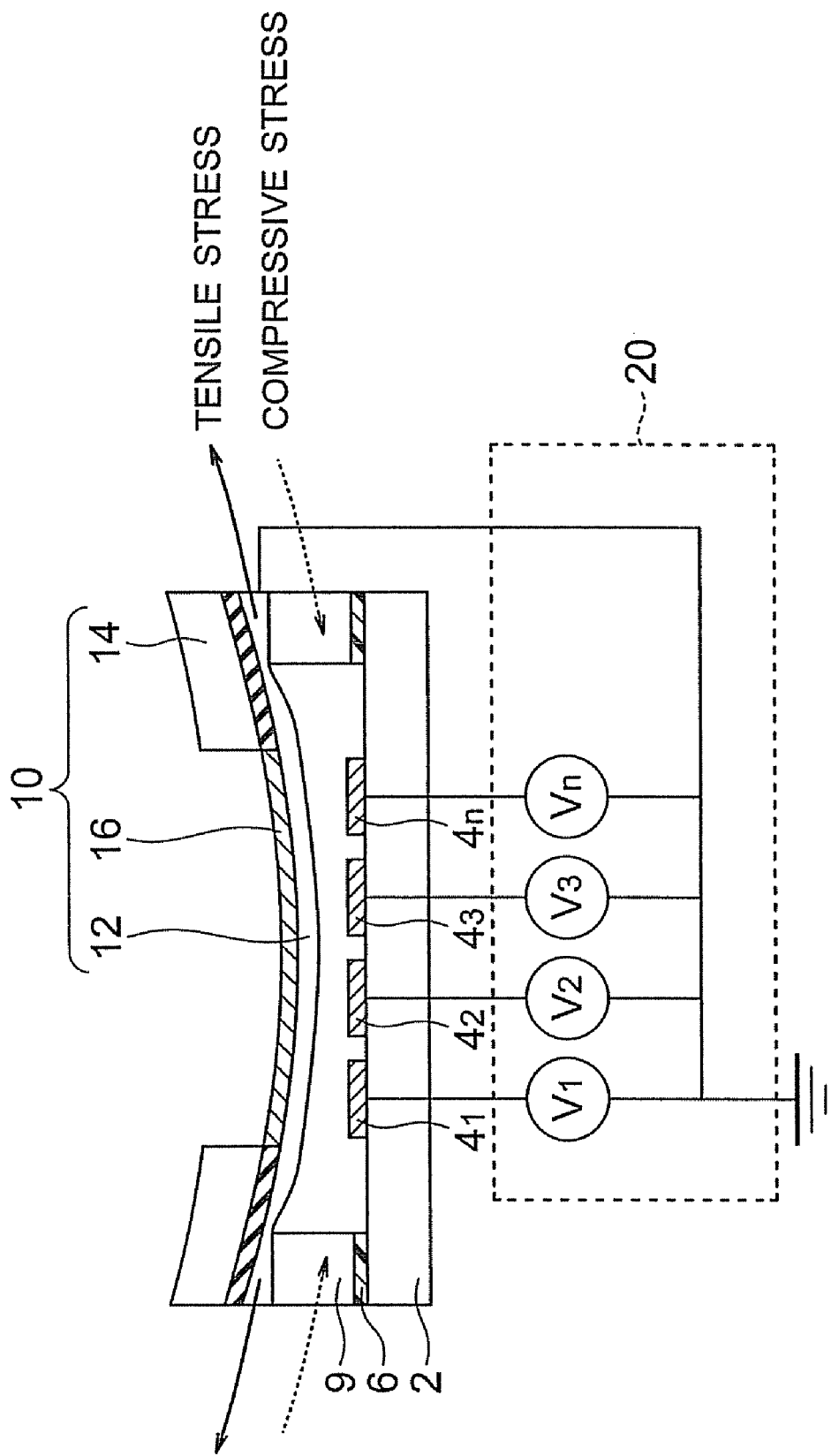

DEFORMABLE MIRROR APPARATUS

CROSS-REFERENCE TO RELATED APPLICATION

This application is based upon and claims the benefit of priority from prior Japanese Patent Application No. 2007-81923 filed on Mar. 27, 2007 in Japan, the entire contents of which are incorporated herein by reference.

BACKGROUND OF THE INVENTION

1. Field of the Invention

The present invention relates to a deformable mirror apparatus.

2. Related Art

In general, the eyeground observation apparatus is an apparatus which irradiates a retina of an eye to be examined with illumination light and receives and detects light of an image of the retina to be examined through a retina image forming optical system by using an image pickup device (for example, a CCD camera) to observe the retina of the eye. For detecting and preventing a disease concerning eyes, it is desirable that the detection accuracy and resolution are high as far as possible. Since an eyeball is not an ideal lens having no aberration, however, the eyeball has wavefront aberration which becomes a factor of lowering the detection accuracy and resolution.

Therefore, a deformable mirror which can vary its surface shape on the basis of information supplied from a controller is provided between the image pickup device which detects the image of the retina and the retina of the eye to be examined. The image of the retina of the eye to be examined reflected by the deformable mirror is led to a wavefront sensor (for example, the Shack Hartmann sensor) to detect the wavefront aberration. On the basis of the detected wavefront aberration, a control device orders the deformable mirror to deform so as to reduce or eliminate the wavefront aberration. As a result of the order, an image having no wavefront aberration is obtained from the image pickup device.

A deformable mirror having a shape changed by electrostatic sucking force is known (see, for example, FIG. 2 in JP-A 2-101402 (KOKAI)). The deformable mirror shown in FIG. 2 in JP-A 2-101402 (KOKAI) has a configuration obtained by forming a fixed electrode film 12 on an insulative substrate 11, forming a spacer 18 having an opening in the center on the fixed electrode film 12, laminating a reflection film 17, a movable electrode film 16 and a $SiO_2$ insulation film 14 on the spacer 18 so as to cover the opening, and forming a silicon substrate 13 having an opening in the center on the laminated film. Therefore, the laminated film formed of the reflection film 17, the movable electrode film 16 and the $SiO_2$ insulation film 14 is constituted as a membrane part having a peripheral part fixed by the spacer 18 and the silicon substrate 13 and a central part deformed by electrostatic force between the fixed electrode 12 and the movable electrode film 16.

In the membrane part, "generated force (load)—deflection characteristics" obtained when a predetermined voltage is applied between the fixed electrode and the movable electrode vary and have anisotropy (non-uniformity) in the plane, under the influence of thermal stress of a film forming the membrane part and a casing part which supports the membrane part (generated by differences in thermal expansion coefficient) and intrinsic stress existing within the thin film of the membrane part (generated from the film structure).

The degree of influence of the boundary conditions (conditions for fixing the membrane part) exerted upon the "generated force (load)—deflection characteristics" is also very large. As a result of composite factors: thermal stress, genuine stress and boundary conditions (conditions for fixing the membrane part), the magnitude of the internal stress on the membrane part (residual stress) changes and the "generated force (load)—deflection characteristics" are influenced.

In the conventional deformable mirror apparatus having small internal stress (residual stress), the deflection shape of the membrane part caused by "generated force (load)—deflection characteristics" becomes gentle and it is difficult to deform the membrane part to a complicated shape (high-order shape) in some cases.

SUMMARY OF THE INVENTION

The present invention has been made in view of these circumstances, and an object thereof is to provide a deformable mirror apparatus which is deformable to a complicated shape (high-order shape).

A deformable mirror apparatus according to a first aspect of the present invention includes: a substrate; a plurality of electrodes provided on the substrate; a spacer fixed above the substrate, having a first opening passing through from a first face of the spacer facing to the substrate to a second face of the spacer facing opposite from the first face, surrounding the electrodes, and having a step on the second face; a drive part comprising a membrane part disposed so as to cover the step of the spacer and so as to be opposed to the electrodes, a casing part having an opening at a bottom face of which the membrane part is exposed and supporting the membrane part, and a reflection film provided on the membrane part; and a voltage generator configured to generate predetermined voltage patterns on the electrodes, respectively.

A deformable mirror apparatus according to a second aspect of the present invention includes: a substrate; a plurality of electrodes provided on the substrate; a spacer fixed above the substrate, having a first opening passing through from a first face of the spacer facing to the substrate to a second face of the spacer facing opposite from the first face, and surrounding the electrodes, and having a taper shape on the second face; a drive part comprising a membrane part disposed so as to cover the taper face of the spacer and so as to be opposed to the electrodes, a casing part having an opening at a bottom face of which the membrane part is exposed and supporting the membrane part, and a reflection film provided on the membrane part; and a voltage generator configured to generate predetermined voltage patterns on the electrodes, respectively.

A deformable mirror apparatus according to a third aspect of the present invention includes: a substrate; a plurality of electrodes provided on the substrate; a spacer fixed above the substrate and surrounding the electrodes; a drive part comprising a membrane part disposed on the spacer so as to be opposed to the electrodes, a casing part having an opening at a bottom face of which the membrane part is exposed and supporting the membrane part, and a reflection film provided on the membrane part; and a voltage generator configured to generate predetermined voltage patterns on the electrodes, respectively, wherein the spacer is formed of a material which is smaller in thermal expansion coefficient than that of the membrane part in the drive part.

A deformable mirror apparatus according to a fourth aspect of the present invention includes: a substrate; a plurality of electrodes provided on the substrate; a spacer fixed above the substrate and surrounding the electrodes; a drive part comprising a membrane part disposed on the spacer so as to be opposed to the electrodes, a casing part having an opening at a bottom face of which the membrane part is exposed and supporting the membrane part, and a reflection film provided on the membrane part; a voltage generator configured to generate predetermined voltage patterns on the electrodes, respectively; and a piezoelectric actuator film provided on an opposite face of the membrane part from the reflection film.

A deformable mirror apparatus according to a fifth aspect of the present invention includes: a substrate; a plurality of electrodes provided on the substrate; a spacer fixed on the substrate and surrounding the electrodes; a drive part comprising a membrane part disposed on the spacer so as to be opposed to the electrodes, a casing part having an opening at a bottom face of which the membrane part is exposed and supporting the membrane part, and a reflection film provided at least on the membrane part; a voltage generator configured to generate predetermined voltage patterns on the electrodes, respectively; and a film provided on a face of the reflection film side of the membrane part or a face on an opposite side from the reflection film and being smaller in thermal expansion coefficient than the membrane part.

BRIEF DESCRIPTION OF THE DRAWINGS

FIG. 4 is a sectional view of a deformable mirror apparatus according to a modification of the first embodiment;

FIGS. 12A to 12D are sectional views for explaining a method for forming a spacer substrate by using a glass substrate;

FIGS. 13A and 13B are diagrams showing a spacer substrate having a step on the surface;

FIGS. 14A and 14B are diagrams showing a spacer substrate having two steps on the surface;

FIGS. 15A and 15B are diagrams showing a spacer substrate having a taper shape on the surface;

FIG. 17 is a sectional view showing a deformable mirror apparatus according to a second embodiment;

DESCRIPTION OF THE EMBODIMENTS

Hereafter, embodiments of the present invention will be described in detail with reference to the drawings.

First Embodiment

Figure 1:
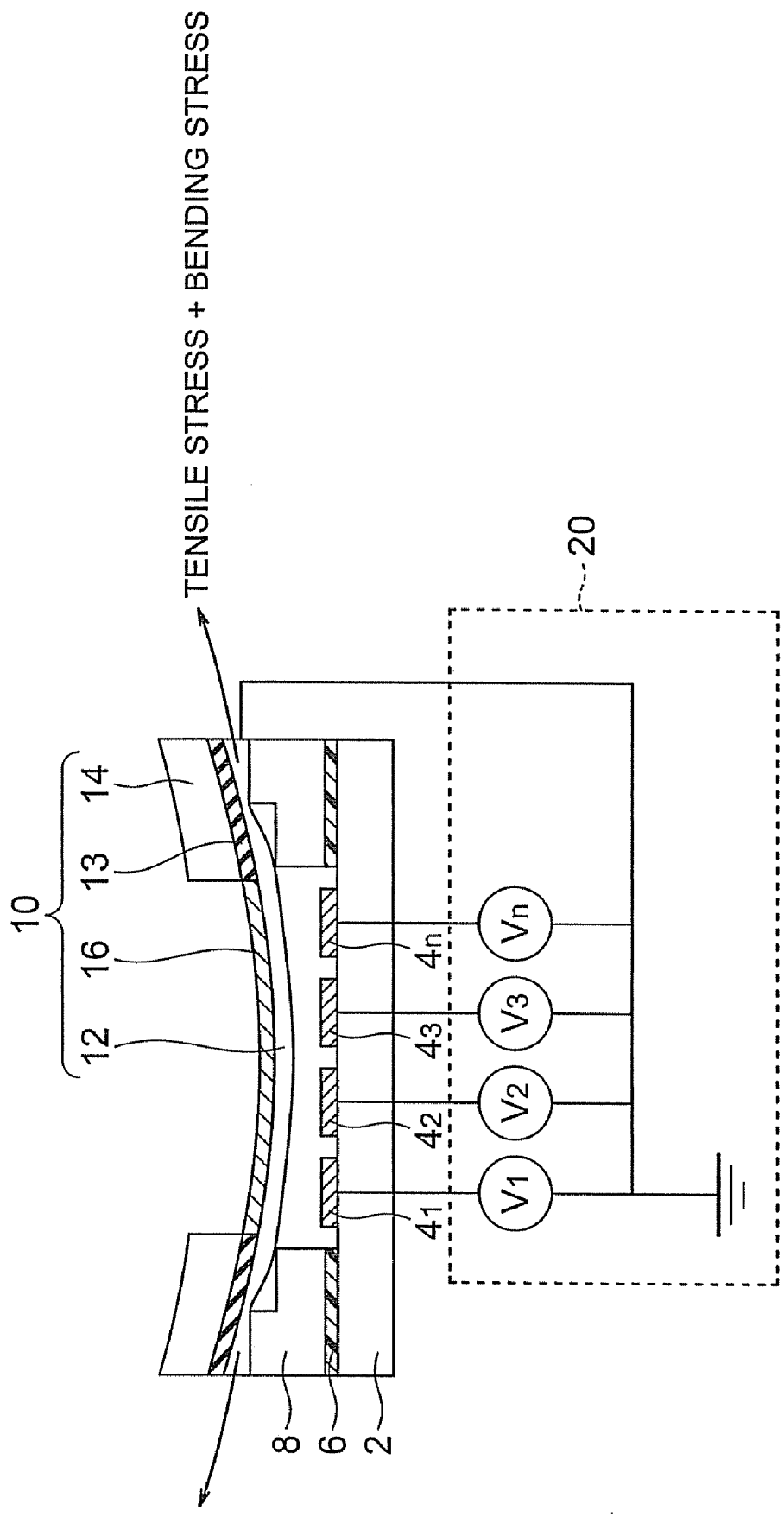
FIG. 1 is a sectional view of a deformable mirror apparatus according to a first embodiment of the present invention.

A deformable mirror apparatus according to a first embodiment of the present invention is shown in FIG. 1. In a deformable mirror apparatus according to the present embodiment, a plurality of electrodes $4_1$ to $4_n$ are formed on a laminated ceramic substrate 2. Furthermore, a spacer substrate 8 having an opening in its central part is provided on the laminated ceramic substrate 2. The spacer substrate 8 is bonded to the laminated ceramic substrate 2 by an adhesive agent 6 so as to dispose a plurality of electrodes 4 on the bottom part of the opening. A step (one step in FIG. 1) is provided on a surface of the spacer substrate 8 on the opposite side from the laminated ceramic substrate 2. A drive part 10 is provided on the surface of the spacer substrate 8 having the step. The drive part 10 includes a membrane part 12 disposed so as to be in contact with and cover the step and so as to be opposed to the electrodes 4, a casing part 14 which supports the membrane part 12 and which has an opening in its central part, a $SiO_2$ film 13 which bonds the membrane part 12 to the casing part 14, and a reflection film 16 formed on the membrane part 12. Voltages $V_1$ to $V_n$ generated from a voltage generator 20 are applied to the electrodes $4_1$ to $4_n$, respectively.

In the deformable mirror apparatus according to the present embodiment, the step is provided on the surface of the spacer substrate 8 and the drive part 10 is clamp bonded so as to be in contact with and covering the step. Therefore, the deformable mirror apparatus is constituted so as to previously generate tensile stress in the membrane part 12 before voltages are applied.

The phenomenon that the deflection shape is made sharp by previously giving tensile stress to the membrane part 12 as in the present embodiment will be described hereafter.

Figure 2:
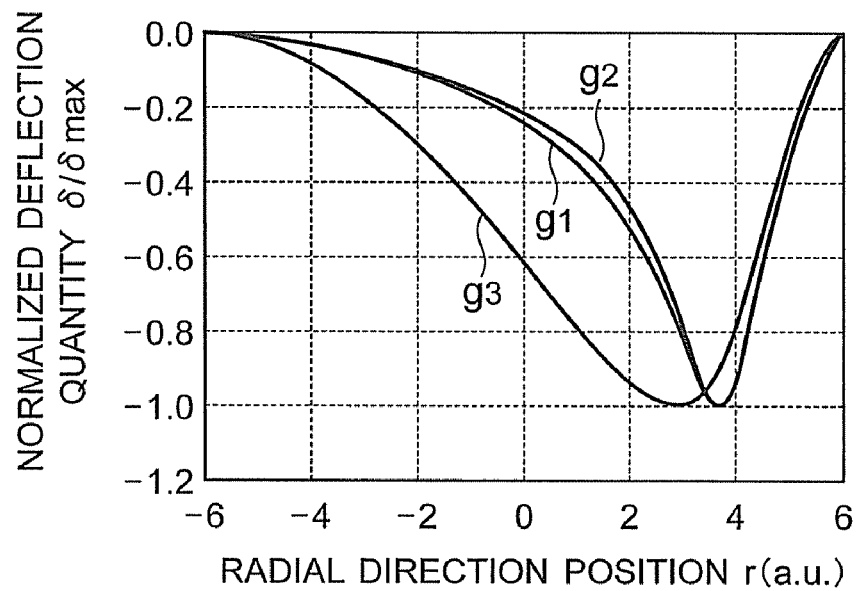
FIG. 2 is a diagram for explaining effects obtained when bending is previously given to the membrane part.

Tensile stress is previously given to the membrane part as in the present embodiment, and a voltage is applied to one electrode located on the right side as compared with the center of the membrane part. Results obtained by examining the deflection quantity of the membrane part in such a case are represented by graphs $g_1$ and $g_2$ in FIG. 2. The graph $g_2$ shows a case where the step is made greater and the previously given tensile stress is made greater as compared with a case of $g_1$. For the purpose of comparison, a deformable mirror apparatus with the spacer substrate 8 in the present embodiment being replaced by a spacer substrate having a flat surface is produced. A voltage is applied to the electrode in the membrane part in the same way as the cases of the graphs $g_1$ and $g_2$. Results obtained by examining the deflection quantity of the membrane part in such a case are represented by a graph $g_3$ in FIG. 2. In other words, the graph $g_3$ represents a case where the previously given tensile stress is zero. As appreciated from FIG. 2, the shape of the membrane part obtained after the voltage is applied when tensile stress is previously given to the membrane part becomes sharper as compared with when tensile stress is not given.

Figure 3:
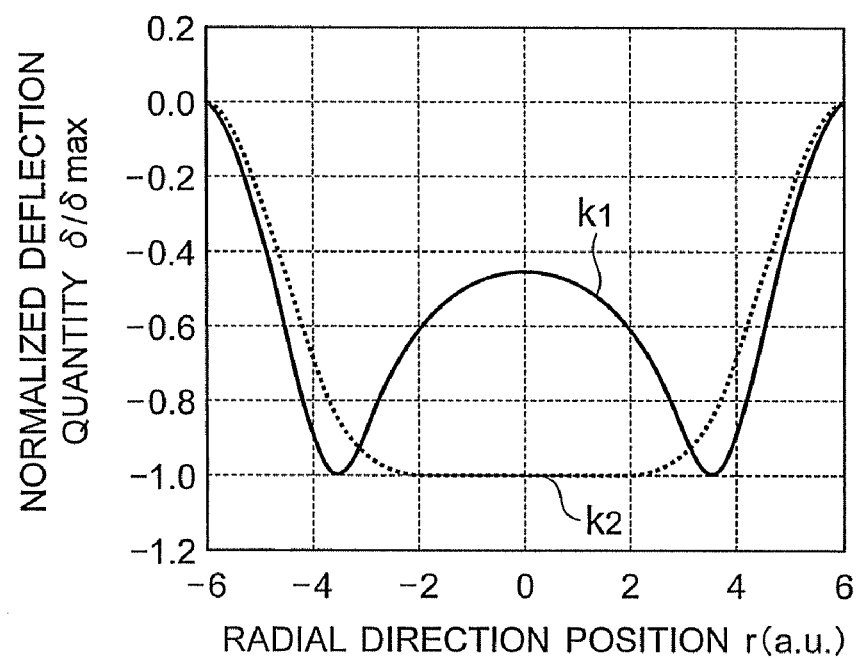
FIG. 3 is a diagram for explaining effects obtained when bending is previously given to the membrane part.

In the same way, tensile stress is previously given to the membrane part as in the present embodiment, and voltages are applied to two electrodes located in positions which are symmetrical about the center of the membrane part 12. Results obtained by examining the deflection quantity of the membrane part 12 in such a case are represented by a graph $k_1$ in FIG. 3. For the purpose of comparison, a deformable mirror apparatus with the spacer substrate 8 in the present embodiment being replaced by a spacer substrate having a flat surface is produced. Voltages are applied to the electrodes in the membrane part in the same way as the case of the graph $k_1$. Results obtained by examining the deflection quantity of the membrane part in such a case are represented by a graph $k_2$ in FIG. 3. As appreciated from FIG. 3, the shape of the membrane part obtained after the voltages are applied when tensile stress is previously given to the membrane part becomes sharper as compared with when tensile stress is not given.

If tensile internal stress (residual stress) remains in the membrane part, then the shape of the membrane part becomes sharp as heretofore described and it becomes easy to form a complicated uneven shape. The Zernike shape which is one of evaluation indexes generally used in the field of optics can also be formed more easily in the case where the internal stress remains, in the same way. It is remarkable especially in the case of deformation to a high-order shape.

For previously giving tensile stress to the membrane part 12, the surface of the spacer substrate 8 may not have one step, but may have a plurality of steps. Or the surface of the spacer substrate 8 may have a taper shape.

In the present embodiment, the steps of the spacer substrate 8 is constituted so as to become lower in height as the position proceeds to the opening and bending is previously given to the membrane part 12 so as to become convex downward (to the electrode side). Alternatively, bending may be previously given to the membrane part 12 so as to become convex upward by using a spacer substrate 8A on which the step becomes higher in height as the position proceeds to the opening side as shown in FIG. 4.

A manufacturing method of the deformable mirror apparatus according to the present embodiment will now be described.

First, a manufacturing method of the drive part 10 will now be described with reference to FIGS. 5A to 6C.

Figure 5A:
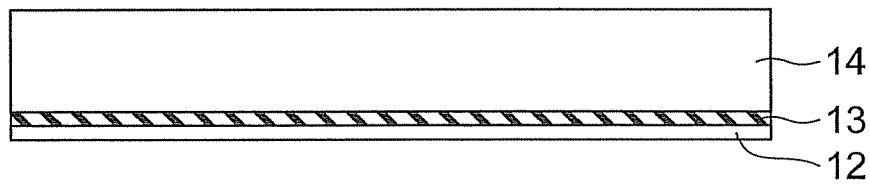
FIGS. 5A to 5D are sectional views for explaining a forming method of a drive part according to the first embodiment.

First, a SOI (Silicon On Insulator) substrate (12, 13 and 14) is prepared as shown in FIG. 5A. In general, the SOI substrate is formed as hereafter described. A single crystal Si substrate 14 is prepared, and a $SiO_2$ film 13 is generated on the whole substrate (both the obverse and reverse) by a thermal oxidation furnace or the like (the film thickness on the obverse is the same as that on the reverse). Thereafter, another single crystal Si substrate 12 is bonded via the $SiO_2$ film 13. After the bonding, the bonded single crystal Si substrate 12 is made thin by a polishing process until a desired thickness is attained. Thereafter, the $SiO_2$ film which has not been used as the bonding face is removed. As a result, an SOI substrate (12, 13 and 14) having a three-layer structure represented as "single crystal Si/$SiO_2$/single crystal Si" is obtained.

Figure 5B:
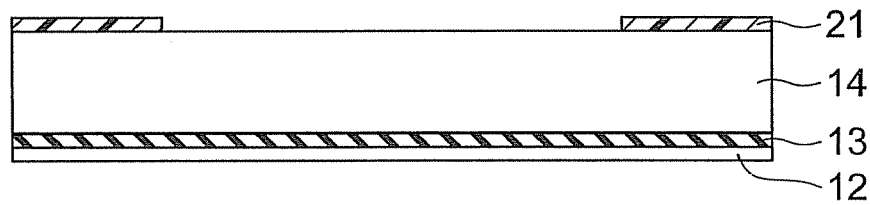
Figure 5C:
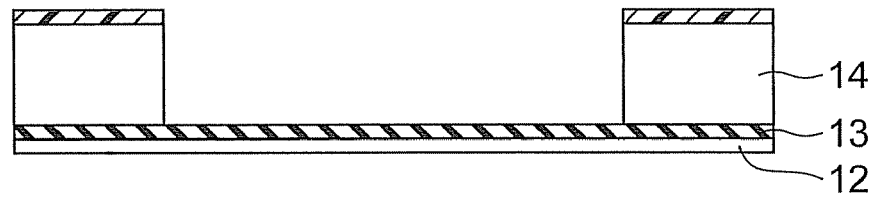
Figure 5D:
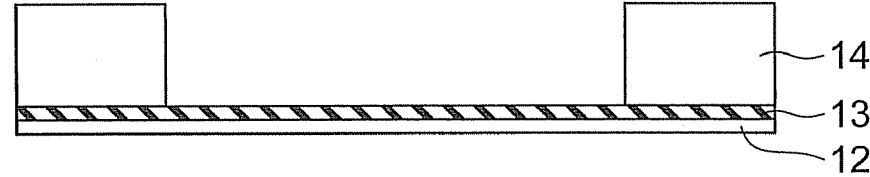

Subsequently, a resist pattern 21 having an opening in the center is formed on the single crystal Si substrate 14 by using a photoresist as shown in FIG. 5B. Dry etching using deep-RIE is conducted on the single crystal Si substrate 14 by using the pattern 21 as a mask. By thus conducting anisotropic processing, a casing part 14 having an opening in the center of the single crystal Si substrate 14 is formed (see FIG. 5C). In the etching process for the single crystal Si substrate 14, the $SiO_2$ film 13 is used as etch stop. In other words, if the $SiO_2$ film 13 is exposed, the etching is finished. Thereafter, the pattern 21 is removed (see FIG. 5D).

Figure 6A:
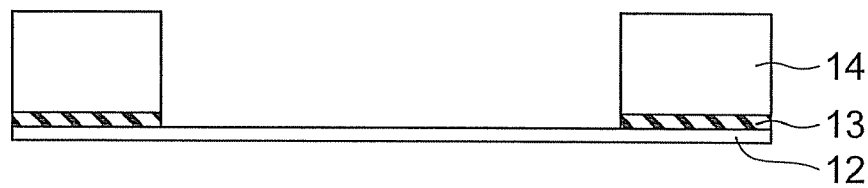
FIGS. 6A to 6C are sectional views for explaining a forming method of a drive part according to the first embodiment.
Figure 6B:
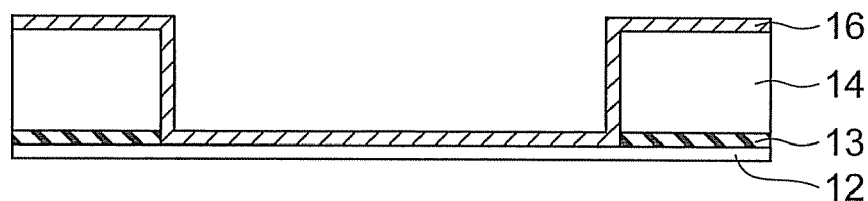
Figure 6C:
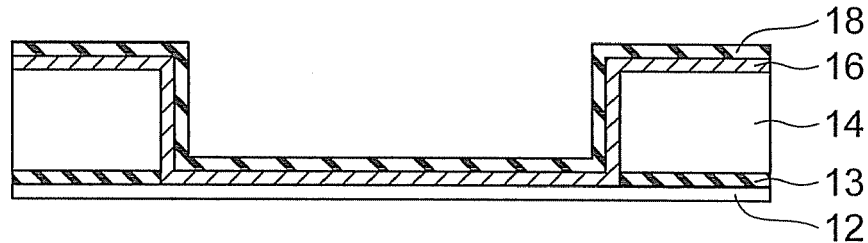

Thereafter, the SOI substrate is immersed in, for example, diluted fluoric acid or ammonium fluoride, and the $SiO_2$ film 13 existing on the bottom part of the opening of the casing part 14 is removed (FIG. 6A). Subsequently, a metal thin film 16 is formed on the reflection face side of the membrane part 12 by using, for example, Al evaporation in order to obtain optical reflection characteristics (FIG. 6B). Finally, a $SiO_2$ thin film 18 is formed as a protection film serving as a countermeasure against cracks and dirt by using, for example, evaporation. The drive part 10 in the deformable mirror apparatus is thus completed (FIG. 6C). By the way, the drive part 10 takes an external shape (plane shape) of, for example, a square.

Figure 7A:
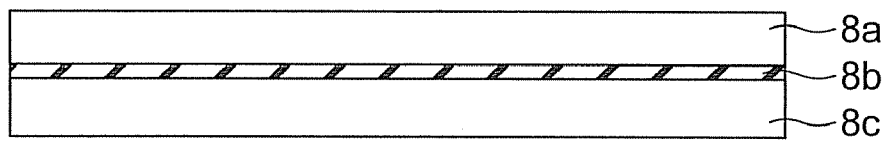
FIGS. 7A to 7E are sectional views for explaining a method for forming a spacer substrate by using a SOI substrate.
Figure 7B:
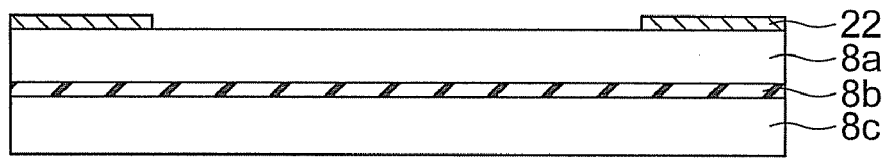
Figure 7C:
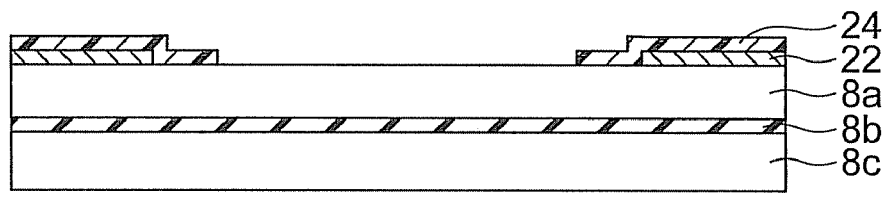
Figure 7D:
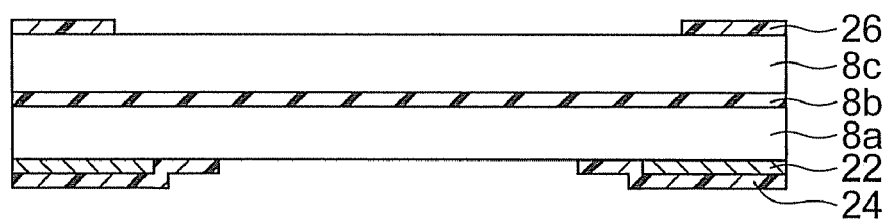
Figure 7E:
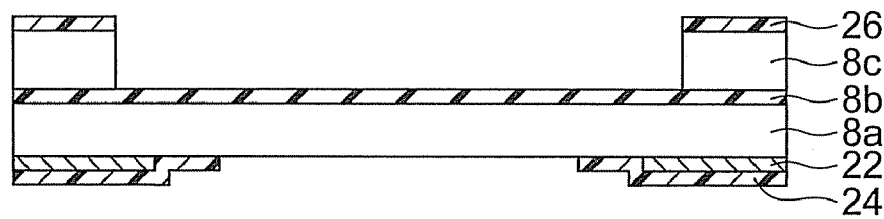

A manufacturing method of the spacer substrate 8 will now be described with reference to FIGS. 7A to 8E. First, a SOI substrate having a single crystal Si substrate 8a/ a $SiO_2$ film 8b/ a single crystal Si substrate 8c is prepared as shown in FIG. 7A. Subsequently, a metal film 22 having a first opening in the center is formed on the single crystal Si substrate 8a as shown in FIG. 7B. Subsequently, a pattern 24 having an opening which is smaller in diameter than the first opening is formed on the metal film 22 by using a photoresist as shown in FIG. 7C. Thereafter, the SOI substrate is turned out and a pattern 26 having a third opening which is larger in diameter than the first opening is formed on the single crystal substrate 8c by using a photoresist as shown in FIG. 7D. Subsequently, the single crystal Si substrate 8c is etched by using the pattern 26 as a mask and using the deep-RIE or wet etching as shown in FIG. 7E. As a result, an opening is formed through the single crystal Si substrate 8c and a $SiO_2$ film 8b is exposed to the bottom of the opening.

Figure 8A:
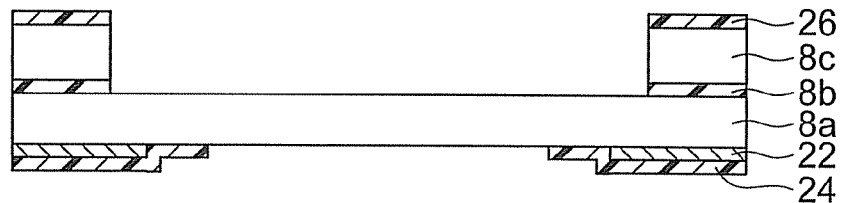
FIGS. 8A to 8E are sectional views for explaining a method for forming a spacer substrate by using a SOI substrate.
Figure 8B:
Figure 8C:
Figure 8D:
Figure 8E:

Subsequently, the $SiO_2$ film 8b which is present on the bottom of the opening of the single crystal Si substrate 8c is removed by etching as shown in FIG. 8A. Subsequently, the SOI substrate is turned out. The single crystal Si substrate 8a is etched by using the resist pattern 24 as a mask and using the deep-RIE to form an opening in the center of the single crystal Si substrate 8a (FIG. 8B). Thereafter, the resist patterns 24 and 26 are removed as shown in FIG. 8c. Subsequently, the exposed surface of the single crystal Si substrate 8a is etched by using the metal film 22 as a mask as shown in FIG. 8D. As a result, a step is formed on the surface of the single crystal Si substrate 8a. Thereafter, the metal film 22 is removed to form the spacer substrate 8 (FIG. 8E).

Figure 9A:
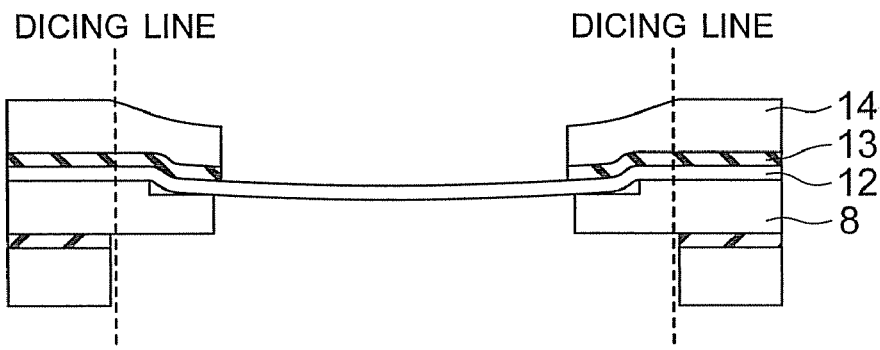
FIGS. 9A and 9B are sectional views for explaining formation of the deformable mirror apparatus according to the first embodiment.
Figure 9B:
Figure 10:
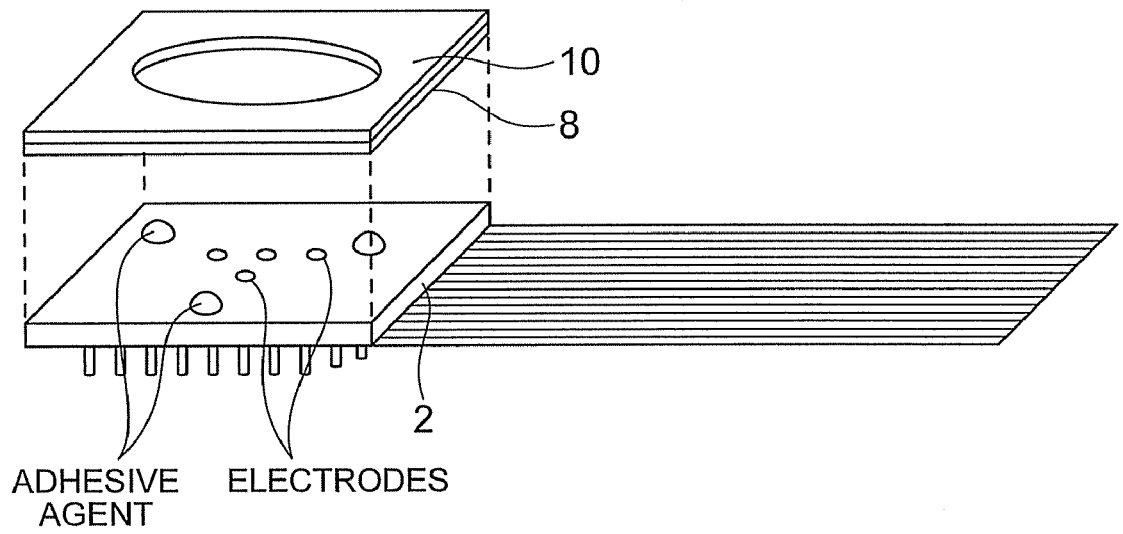
FIG. 10 is an oblique view for explaining the formation of the deformable mirror apparatus according to the first embodiment.

A manufacturing method of the deformable mirror apparatus according to the present embodiment will now be described. The drive part 10 shown in FIG. 6C is placed on the spacer substrate 8 formed as described above and shown in FIG. 8E so as to bring the membrane part 12 into contact with the step of the spacer substrate 8. After they are clamped, anodic bonding or direct bonding is conducted (FIG. 9A). Thereafter, cutting is conducted along cutting lines represented by dashed lines by using a dicing saw or the like and a body obtained by bonding the spacer substrate 8 and the drive part 10 is formed as shown in FIG. 9B. Thereafter, the body obtained by bonding the spacer substrate 8 and the drive part 10 is bonded to the laminated ceramic substrate 2 having a plurality of electrodes $4_1$ to $4_n$ formed thereon by using a bonding agent as shown in FIG. 10. Thus, the deformable mirror apparatus according to the embodiment is formed.

Figure 11A:
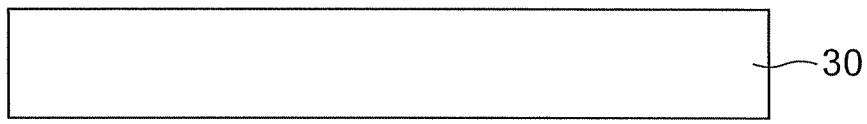
FIGS. 11A to 11E are sectional views for explaining a method for forming a spacer substrate by using a glass substrate.
Figure 11B:
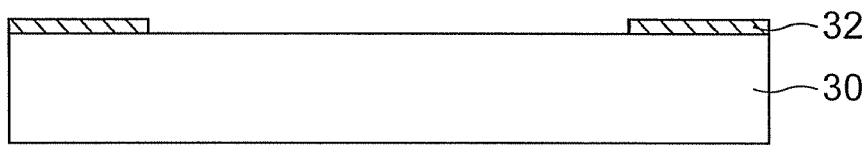
Figure 11C:
Figure 11D:
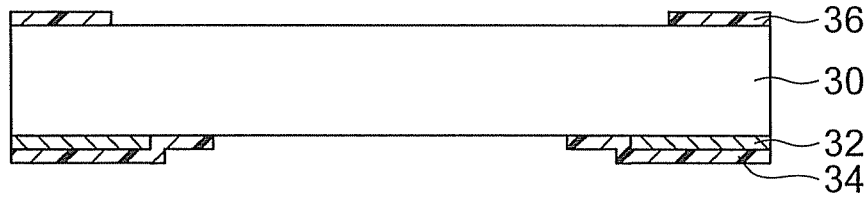
Figure 11E:
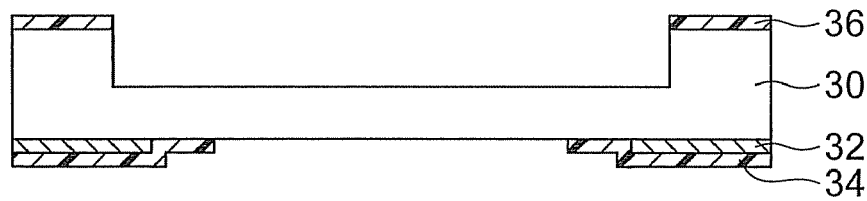

The SOI substrate is used to manufacture the spacer substrate 8. Alternatively, a glass substrate may also be used. A method for forming the spacer substrate 8 by using the glass substrate will now be described with reference to FIGS. 11A to FIG. 12D. First, a glass substrate 30 is prepared as shown in FIG. 11A. Subsequently, a metal film 32 having a first opening in its center is formed on the glass substrate 30 as shown in FIG. 11B. Subsequently, a pattern 34 having an opening which is smaller in diameter than the first opening is formed on the metal film 32 by using a photoresist as shown in FIG. 11C. Thereafter, the glass substrate is turned out and a pattern 36 having a third opening which is larger in diameter than the first opening is formed on the reverse of the glass substrate 30 by using a photoresist as shown in FIG. 11D. Subsequently, the glass substrate 30 is etched by using the pattern 36 as a mask and using, for example, sand blast, wet etching or dry etching as shown in FIG. 11E.

Subsequently, the glass substrate 30 is etched by using the pattern 34 as a mask and using, for example, sand blast, wet etching or dry etching so as to form an opening in the center of the glass substrate 30 as shown in FIG. 12A. Thereafter, the patterns 34 and 36 are removed as shown in FIG. 12B. Subsequently, an exposed surface of the glass substrate 30 is etched by using the metal film 32 as a mask to form a step on the surface of the glass substrate 30 as shown in FIG. 12C. Thereafter, the metal film 32 is removed to form the spacer substrate 8 (FIG. 12D).

A sectional view and a plan view of the spacer substrate 8 before being bonded to the drive part 10 in the present embodiment are shown in FIGS. 13A and 13B, respectively. The spacer substrate 8 in the present embodiment takes a plane shape of a square. A sectional view and a plan view of the spacer substrate 8 having two steps on the surface before being bonded to the drive part 10 are shown in FIGS. 14A and 14B, respectively. A sectional view and a plan view of the spacer substrate 8 having a taper surface shape before being bonded to the drive part 10 are shown in FIGS. 15A and 15B, respectively.

Figure 16A:
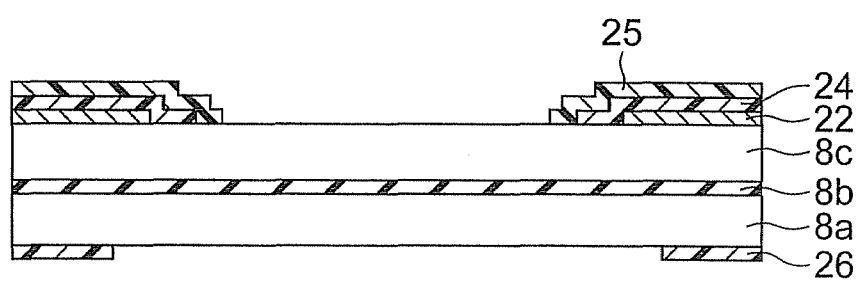
FIGS. 16A and 16B are sectional views showing formation of a spacer substrate having two steps on the surface.
Figure 16B:

As for a method for forming the spacer substrate 8 having two steps on the surface, a metal film or resist pattern 22, a metal film or resist pattern 24, and a metal film or resist pattern 25 are formed on the single crystal Si substrate 8c of the SOI substrate as shown in FIG. 16A. By conducting formation in the same way as the case where there is one step on the surface, the spacer substrate having two steps on the surface can be obtained as shown in FIG. 16B.

As for the case where the surface takes a taper shape, a multi-step is formed on the surface of the spacer substrate by using dry etching using a gradation mask and thereafter edges of the step are etched by using wet etching. As a result, the surface having a smooth taper shape can be obtained.

According to the present embodiment, a deformable mirror apparatus which can be deformed to a complicated shape (high-order shape) can be obtained by previously giving tensile stress to the membrane part 12 as heretofore described.

Second Embodiment

A deformable mirror apparatus according to a second embodiment of the present invention is shown in FIG. 17.

The deformable mirror apparatus according to the present embodiment is formed by replacing the spacer substrate 8 in the first embodiment with a spacer substrate 9 (made of, for example, glass) which has a flat surface and which is smaller in thermal expansion coefficient than the membrane part 12 and the casing part 14 included in the drive part 10, and conducting anodic bonding with the drive part 10 under heating (at, for example, 350° C.). In a state in which voltages are not applied to the electrodes $4_1$ to $4_n$ in the deformable mirror apparatus according to the present embodiment, therefore, tensile stress and compressive stress caused by a thermal expansion coefficient difference act near the interface between the spacer substrate 9 and the membrane part 12. As a result, a change is caused in the boundary condition (fixing condition of the membrane part 12) and tensile internal stress can be previously given to the membrane part 12 in the same way as the first embodiment. Thus, a deformable mirror apparatus which can be deformed to a complicated shape (high-order shape) can be obtained. The spacer substrate 9 before the anodic bonding is conducted has the same shape as that of the spacer substrate 8 in the first embodiment except that the surface is flat.

In the second embodiment, the anodic bonding may be formed with the drive part 10 under heating (for example, 350° C.) by using the spacer substrate 8 having a step or a taper shape on the surface as described in the first embodiment. In this case as well, a change is caused in thermal stress or the boundary condition in the membrane part 12 (fixing condition of the membrane part 12) in the state in which voltages are not applied to the electrodes $4_1$ to $4_n$, in the same way as the second embodiment. Tensile internal stress can be previously given to the membrane part 12 in the same way as the first embodiment. As a result, a deformable mirror apparatus which can be deformed to a complicated shape (high-order shape) can be obtained. By the way, the membrane part 12 may be constituted so as to have a convex shape upward.

Third Embodiment

Figure 18:
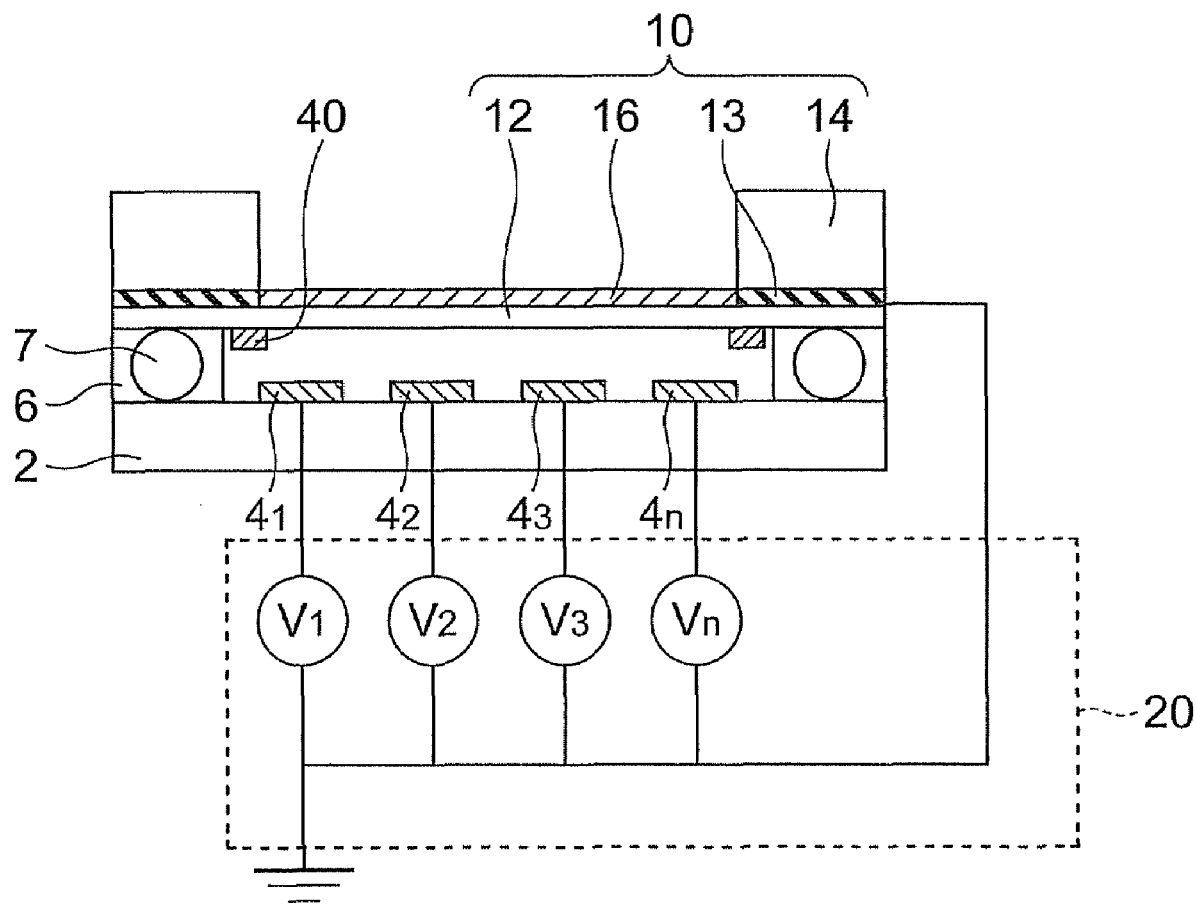
FIG. 18 is a sectional view showing a deformable mirror apparatus according to a third embodiment.

A deformable mirror apparatus according to a third embodiment of the present invention is shown in FIG. 18.

The deformable mirror apparatus according to the present embodiment has a configuration obtained from the configuration in the first embodiment shown in FIG. 1 by replacing the spacer substrate 8 with a spacer 7 and sticking a doughnut-shaped thin film piezoelectric actuator 40 on an opposite side of the membrane part 12 from the reflection film 16 (on a side opposed to the electrodes) or forming a film. The thin film piezoelectric actuator 40 is provided in a position where the operation of deforming the membrane part 12 by electrostatic sucking force is not interfered. By the way, the spacer 7 is bonded to the substrate 2 and the membrane part 12 by using an adhesive agent 6.

Figure 19:
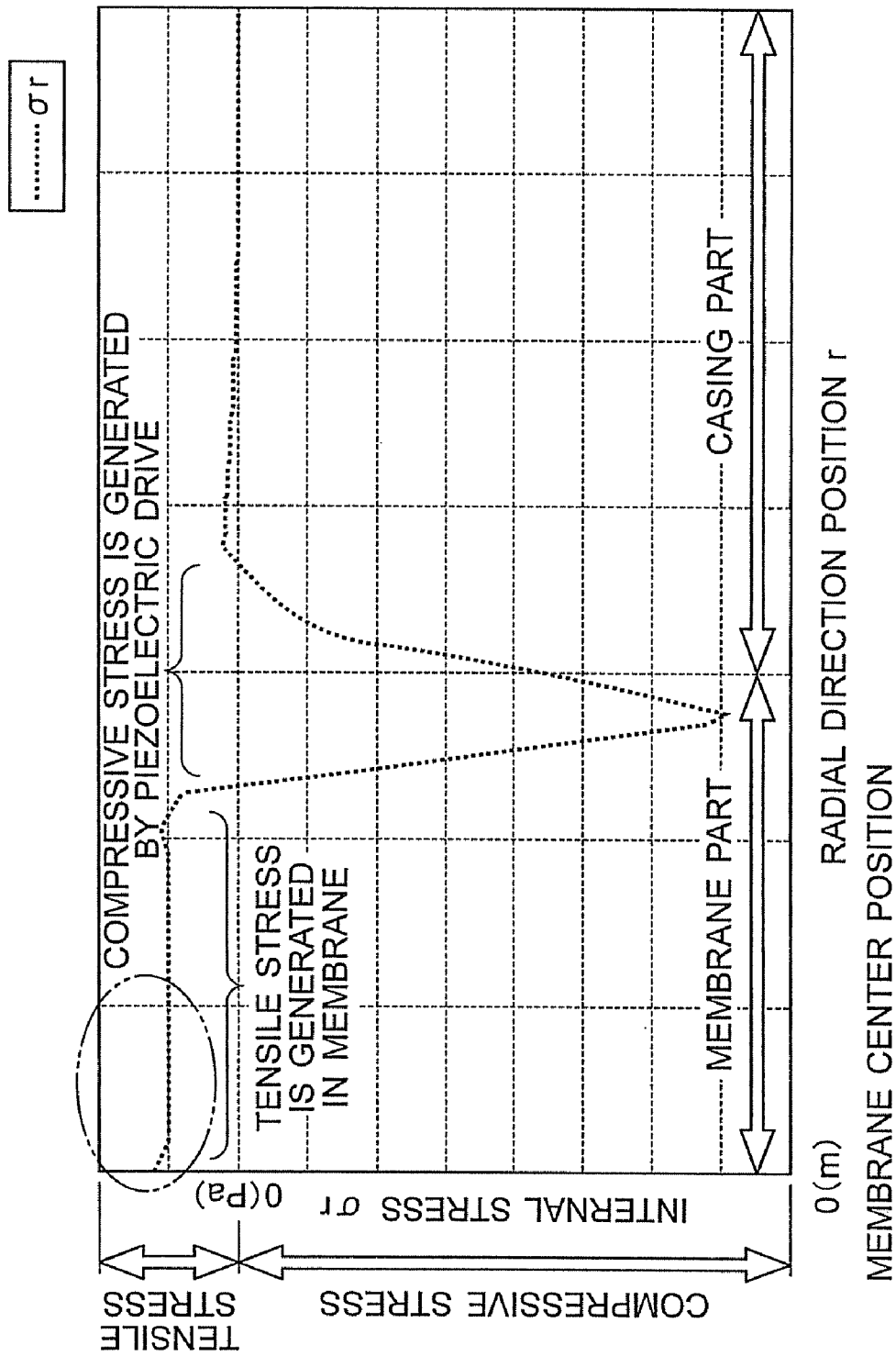
FIG. 19 is a diagram showing effects brought about by the third embodiment.

In the structure of the present embodiment, stress caused in the membrane part 12 when currents are let flow through the electrodes $4_1$ to $4_n$ and the membrane part 12 is calculated by using the finite element method. Results of the calculation are shown in FIG. 19. As appreciated from FIG. 19, tensile internal stress $\sigma_r$ is generated in an area surrounded by an ellipse in FIG. 19.

In the deformable mirror apparatus according to the present embodiment as well, it becomes possible to cause a change in the boundary condition of the membrane part 12 to previously give tensile internal stress to the membrane part 12 and deform the deformable mirror apparatus to a complicated shape (high-order shape). The membrane part 12 may be constituted so as to take a convex shape upward. As long as the thin film piezoelectric actuator 40 is disposed outside an effective area of the membrane part 12, the thin film piezoelectric actuator 40 may be stuck on a side on which the reflection film 16 of the membrane part 12 is formed, or may have a configuration obtained by forming a film.

Fourth Embodiment

Figure 20:
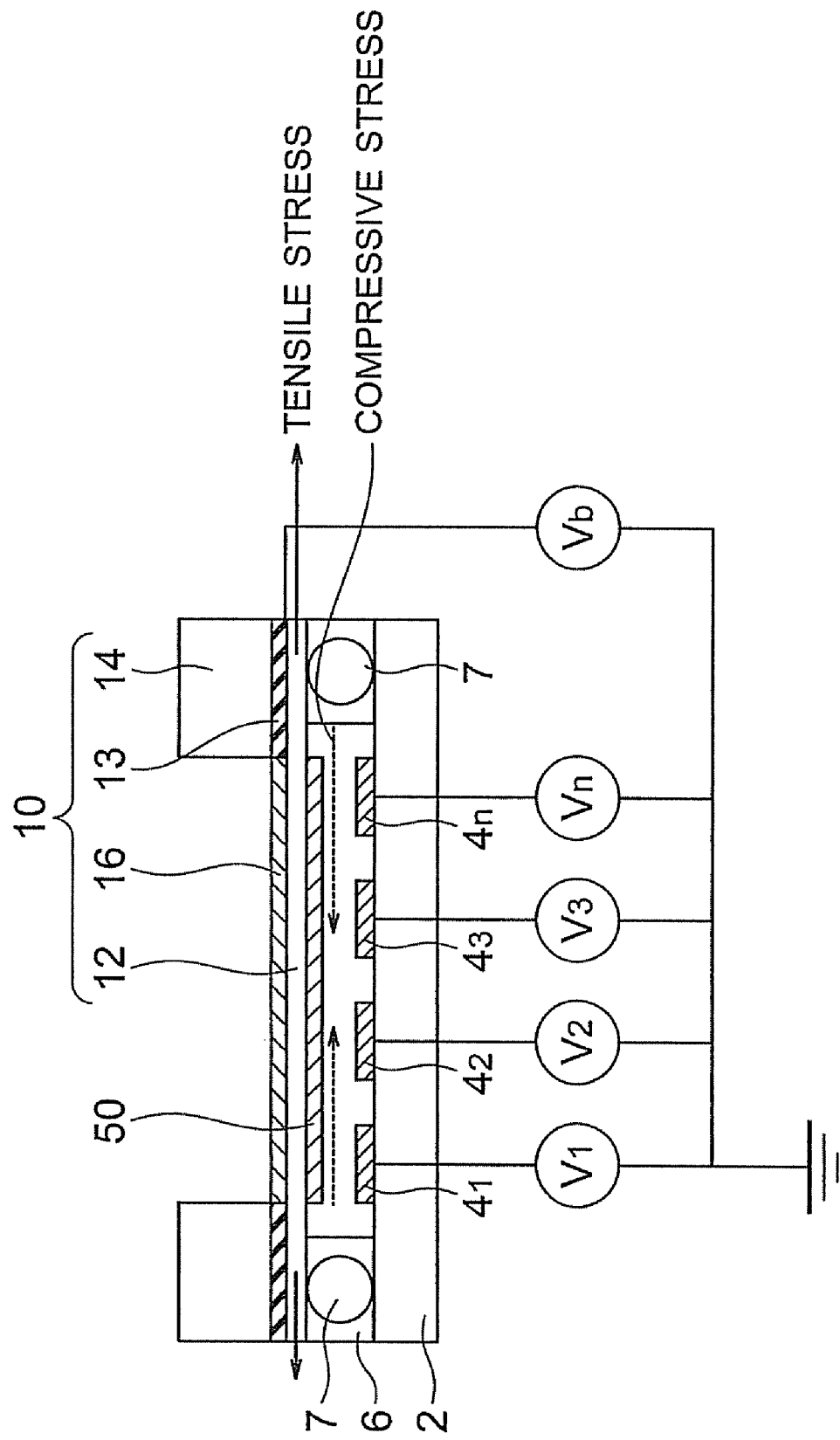
FIG. 20 is a sectional view showing a deformable mirror apparatus according to a fourth embodiment.

A deformable mirror apparatus according to a fourth embodiment of the present invention is shown in FIG. 20. The deformable mirror apparatus according to the present embodiment has a configuration obtained from the configuration in the first embodiment shown in FIG. 1 by replacing the spacer substrate 8 with a spacer 7 and providing a thin film 50 which is smaller in thermal expansion coefficient than the membrane part 12 and the casing part 14 included in the drive part 10 on an opposite side of the membrane part 12 from the reflection film 16 (on a side opposed to the electrodes).

In the deformable mirror apparatus according to the present embodiment as well, it becomes possible to cause a change in the thermal stress of the membrane part 12 and consequently deform the deformable mirror apparatus to a complicated shape (high-order shape). By the way, a thin film 50 which is smaller in thermal expansion coefficient than the membrane part 12 and the casing part 14 included in the drive part 10 may be formed on the side of the reflection film 16 so as to cause the membrane part 12 to take a convex shape upward.

According to the embodiments of the present invention, a deformable mirror apparatus which can be deformed to a complicated shape (high-order shape) can be provided as heretofore described.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A deformable mirror apparatus comprising:
    a substrate;
    a plurality of electrodes provided on the substrate;
    a spacer fixed above the substrate, having a first opening passing through from a first face of the spacer facing to the substrate to a second face of the spacer facing opposite from the first face, surrounding the electrodes, and having a step on the second face;
    a drive part comprising a membrane part disposed so as to cover the step of the spacer and so as to be opposed to the electrodes, a casing part having an opening at a bottom face of which the membrane part is exposed and supporting the membrane part, and a reflection film provided on the membrane part; and
    a voltage generator configured to generate predetermined voltage patterns on the electrodes, respectively.

2. The apparatus according to claim 1, wherein the spacer is formed of the same material as that of the membrane part in the drive part.

3. The apparatus according to claim 1, wherein the spacer is formed of a material which is smaller in thermal expansion coefficient than that of the membrane part in the drive part.

4. A deformable mirror apparatus comprising:
    a substrate;
    a plurality of electrodes provided on the substrate;
    a spacer fixed above the substrate, having a first opening passing through from a first face of the spacer facing to the substrate to a second face of the spacer facing opposite from the first face, and surrounding the electrodes, and having a taper shape on the second face;
    a drive part comprising a membrane part disposed so as to cover the taper face of the spacer and so as to be opposed to the electrodes, a casing part having an opening at a bottom face of which the membrane part is exposed and supporting the membrane part, and a reflection film provided on the membrane part; and
    a voltage generator configured to generate predetermined voltage patterns on the electrodes, respectively.

5. The apparatus according to claim 4, wherein the spacer is formed of the same material as that of the membrane part in the drive part.

6. The apparatus according to claim 4, wherein the spacer is formed of a material which is smaller in thermal expansion coefficient than that of the membrane part in the drive part.

7. A deformable mirror apparatus comprising:
    a substrate;
    a plurality of electrodes provided on the substrate;
    a spacer fixed above the substrate and surrounding the electrodes;
    a drive part comprising a membrane part disposed on the spacer so as to be opposed to the electrodes, a casing part having an opening at a bottom face of which the membrane part is exposed and supporting the membrane part, and a reflection film provided on the membrane part; and
    a voltage generator configured to generate predetermined voltage patterns on the electrodes, respectively,
    wherein the spacer is formed of a material which is smaller in thermal expansion coefficient than that of the membrane part in the drive part.

* * * * *